United States Patent [19]

Forrest et al.

[11] 4,413,880

[45] Nov. 8, 1983

[54] ADAPTABLE CONNECTOR FOR A FIBER OPTIC TESTING DEVICE

[75] Inventors: John W. Forrest, Acton; Thomas DeFusco, Worcester, both of Mass.

[73] Assignee: Bowmar/ALI, Inc., Acton, Mass.

[21] Appl. No.: 222,189

[22] Filed: Jan. 2, 1981

[51] Int. Cl.³ .................................................. G02B 7/26
[52] U.S. Cl. .................................................. 350/96.20
[58] Field of Search ................ 350/96.20, 96.21, 96.22

[56] References Cited

U.S. PATENT DOCUMENTS

| | | | |
|---|---|---|---|
| 3,267,932 | 8/1966 | Valliere | 128/675 |
| 3,420,949 | 1/1969 | McNaney | 350/96.24 X |
| 3,596,587 | 8/1971 | Klinger | 98/115 R |
| 3,637,284 | 1/1972 | Plyler | 350/96.20 |
| 3,655,275 | 4/1972 | Seagreaves | 350/320 |
| 3,734,594 | 5/1973 | Trambarulo | 350/96.21 |
| 3,791,715 | 2/1974 | Lean et al. | 350/96.17 |
| 3,806,225 | 4/1974 | Codrino | 350/96.20 |
| 3,880,452 | 4/1975 | Fields | 350/96.22 X |
| 3,884,585 | 5/1975 | Lebduska | 356/73.1 X |
| 3,904,269 | 9/1975 | Lebduska et al. | 350/96.22 |
| 3,910,678 | 10/1975 | McCartney et al. | 350/96.22 |
| 3,914,015 | 10/1975 | McCartney | 350/96.22 |
| 3,944,328 | 3/1976 | Kent et al. | 350/96.21 |
| 3,947,182 | 3/1976 | McCartney | 350/96.22 |
| 3,948,582 | 4/1976 | Martin | 350/96.21 |
| 3,950,075 | 4/1976 | Cook et al. | 350/96.22 |
| 3,954,338 | 5/1976 | Hennel et al. | 350/96.21 X |
| 3,963,323 | 6/1976 | Arnold | 350/96.22 |
| 3,984,174 | 10/1976 | Landgreen | 350/96.22 |
| 3,995,935 | 12/1976 | McCartney | 350/96.21 X |
| 3,999,837 | 12/1976 | Bowen et al. | 350/96.22 |
| 4,008,948 | 2/1977 | Dalgleish et al. | 350/96.21 |
| 4,015,894 | 4/1977 | Rocton | 350/96.21 |
| 4,018,506 | 4/1977 | Hammer | 350/96.17 |
| 4,021,099 | 5/1977 | Kawasaki | 350/96.15 |
| 4,027,938 | 6/1977 | Lewis | 350/96.22 |
| 4,030,810 | 6/1977 | Khoe | 350/96.21 X |
| 4,047,796 | 9/1977 | Kao et al. | 350/96.20 |
| 4,047,797 | 9/1977 | Arnold et al. | 350/96.22 |
| 4,053,764 | 10/1977 | Sierak et al. | 250/227 |
| 4,054,366 | 10/1977 | Barnoski et al. | 350/96.15 |
| 4,076,376 | 2/1978 | Slaughter | 350/96.21 |
| 4,076,379 | 2/1978 | Chouinard | 350/96.22 |
| 4,078,432 | 3/1978 | Stewart | 350/96.21 X |
| 4,081,258 | 3/1978 | Goell et al. | 356/73.1 X |
| 4,087,158 | 5/1978 | Lewis et al. | 350/96.21 |
| 4,090,793 | 5/1978 | Lebduska | 356/73.1 |
| 4,097,118 | 6/1978 | Hammer | 350/96.17 |
| 4,097,129 | 6/1978 | Wellington et al. | 350/96.21 X |
| 4,101,197 | 7/1978 | Kent et al. | 350/96.17 |
| 4,101,198 | 7/1978 | Heldt | 350/96.20 |
| 4,105,285 | 8/1978 | Bedgood et al. | 350/96.21 |
| 4,110,000 | 8/1978 | Bogar et al. | 350/96.21 |
| 4,114,979 | 9/1978 | Heldt | 350/96.21 |
| 4,116,655 | 9/1978 | Lewis | 350/96.22 X |
| 4,118,100 | 10/1978 | Goell et al. | 350/96.20 |
| 4,124,271 | 11/1978 | Green | 350/96.20 |
| 4,124,272 | 11/1978 | Henderson et al. | 350/96.21 |
| 4,127,319 | 11/1978 | Forney, Jr. et al. | 350/96.22 X |
| 4,140,365 | 2/1979 | Burger et al. | 350/96.20 |
| 4,140,366 | 2/1979 | Makuch et al. | 350/96.22 |
| 4,140,367 | 2/1979 | Makuch et al. | 350/96.22 |
| 4,146,300 | 3/1979 | Kaiser | 350/96.21 |
| 4,148,557 | 4/1979 | Garvey | 350/96.20 |
| 4,156,556 | 5/1979 | Klein et al. | 350/96.15 |
| 4,168,108 | 9/1979 | Judeinstein | 350/96.22 |
| 4,168,109 | 9/1979 | Dumire | 350/96.22 |
| 4,170,399 | 10/1979 | Hansen et al. | 350/96.20 |
| 4,173,390 | 11/1979 | Käch | 350/96.16 |
| 4,179,801 | 12/1979 | Hollis | 350/96.20 X |
| 4,181,401 | 1/1980 | Jensen | 350/96.21 |
| 4,184,742 | 1/1980 | Corrales | 350/96.21 |
| 4,185,886 | 1/1980 | Corrales | 350/96.21 |
| 4,186,998 | 2/1980 | Holzman | 350/96.21 |
| 4,190,317 | 2/1980 | Makuch | 350/96.20 |
| 4,204,306 | 5/1980 | Makuch | 350/96.20 X |
| 4,205,897 | 6/1980 | Stankos | 350/96.21 |
| 4,208,092 | 6/1980 | Monaghan et al. | 350/96.21 |
| 4,212,152 | 7/1980 | Roman | 57/207 |
| 4,213,670 | 7/1980 | Milton et al. | 350/96.16 |
| 4,213,671 | 7/1980 | Lambert | 350/96.21 |
| 4,222,629 | 9/1980 | Dassele et al. | 350/96.20 |
| 4,229,402 | 10/1980 | Villarruel et al. | 350/96.20 X |
| 4,232,934 | 11/1980 | Feinbloom | 350/96.20 |
| 4,255,015 | 3/1981 | Adams et al. | 350/96.20 |
| 4,255,016 | 3/1981 | Borsuk | 350/96.21 |
| 4,257,124 | 3/1981 | Porter et al. | 455/601 |
| 4,261,641 | 4/1981 | Porter | 350/96.16 |
| 4,262,995 | 4/1981 | Tangonan | 350/96.16 |

| | | | |
|---|---|---|---|
| 4,268,115 | 5/1981 | Slemon et al. | 350/96.21 |
| 4,279,468 | 7/1981 | Turley et al. | 350/96.21 |
| 4,285,572 | 8/1981 | Beaudette et al. | 350/96.20 |

FOREIGN PATENT DOCUMENTS

| | | | |
|---|---|---|---|
| 1003253 | 1/1977 | Canada | 350/96.20 |
| 1499359 | 2/1978 | United Kingdom . | |
| 2032643 | 5/1980 | United Kingdom | 350/96.20 |
| 2040062 | 8/1980 | United Kingdom | 350/96.20 |

OTHER PUBLICATIONS

Outlook, p. 17, Jun. 1980.
Pifax Pir-140 Type B (Publication Date Unknown), E-38254.
IFOC Handbook and Buyer's Guide, 1980-1981, pp. 1,2 (ISSN 02171-5406).
Cannon ITT HDC Interface Nov. 1980, E-38252.
Spectronics Division of Honeywell, Ga AIAs Light Emitting Diode, SE4352, Jul. 1980.

*Primary Examiner*—John D. Lee
*Attorney, Agent, or Firm*—Seidel, Gonda & Goldhammer

[57] ABSTRACT

A connector is provided for connecting unterminated optical fiber cables to test sets or the like. The connector has a cable adapter section and an optical fiber adapter section. The cable adapter section is partly slotted and has a cylindrical bore for receiving the cable. The outer dimensions of the cable adapter section cooperate with a sliding ring to form a clamp for holding the cable securely. The optical fiber adapter section has a cylindrical bore coaxially aligned with the bore of the cable adapter section and receives the unsheathed optical fiber and maintains it in precise optical alignment within the test set. Disposed between the cable adapter section and the fiber adapter section is a conical chamber for guiding the optical fiber to the bore of the fiber adapter section.

2 Claims, 6 Drawing Figures

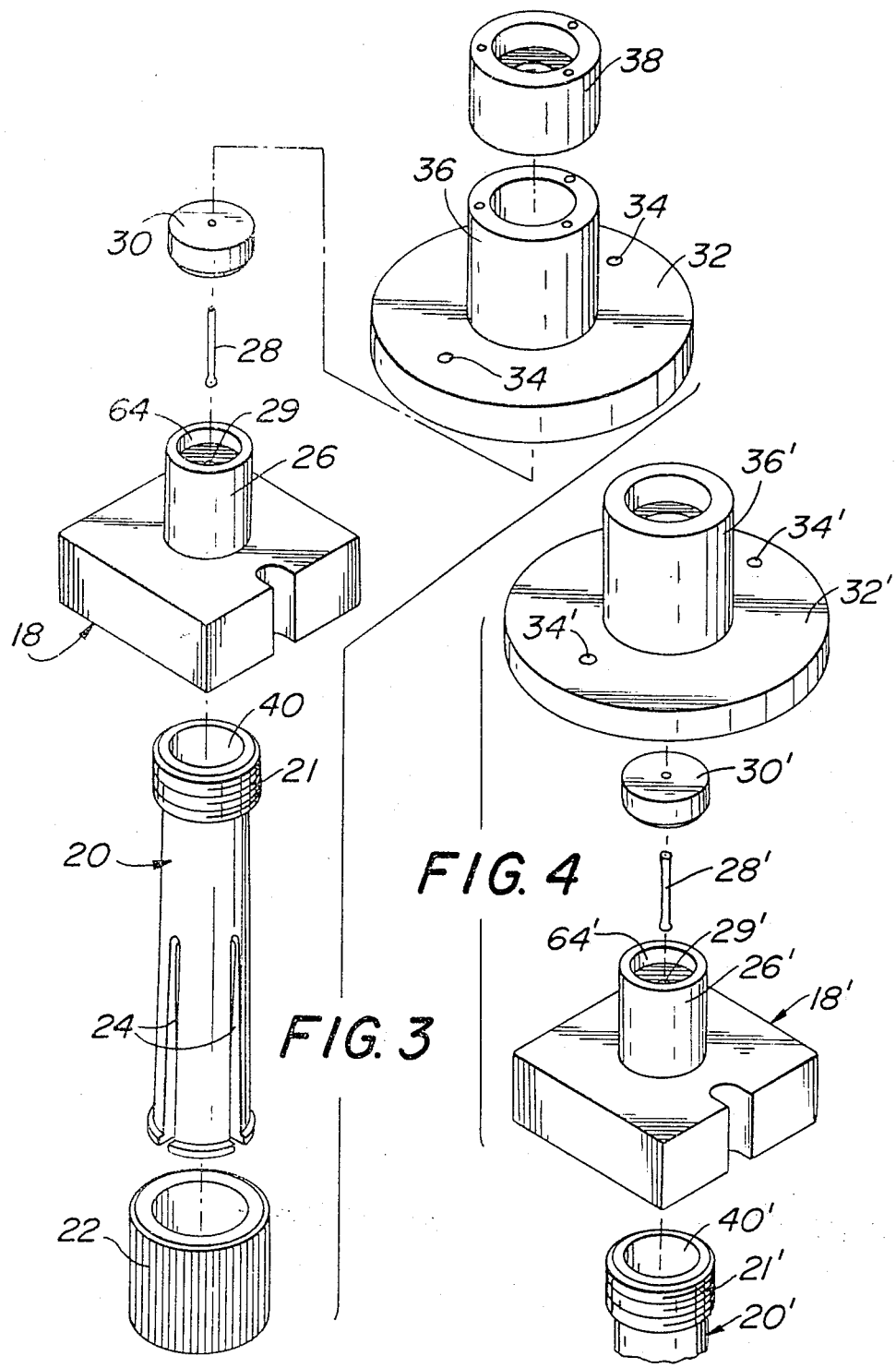

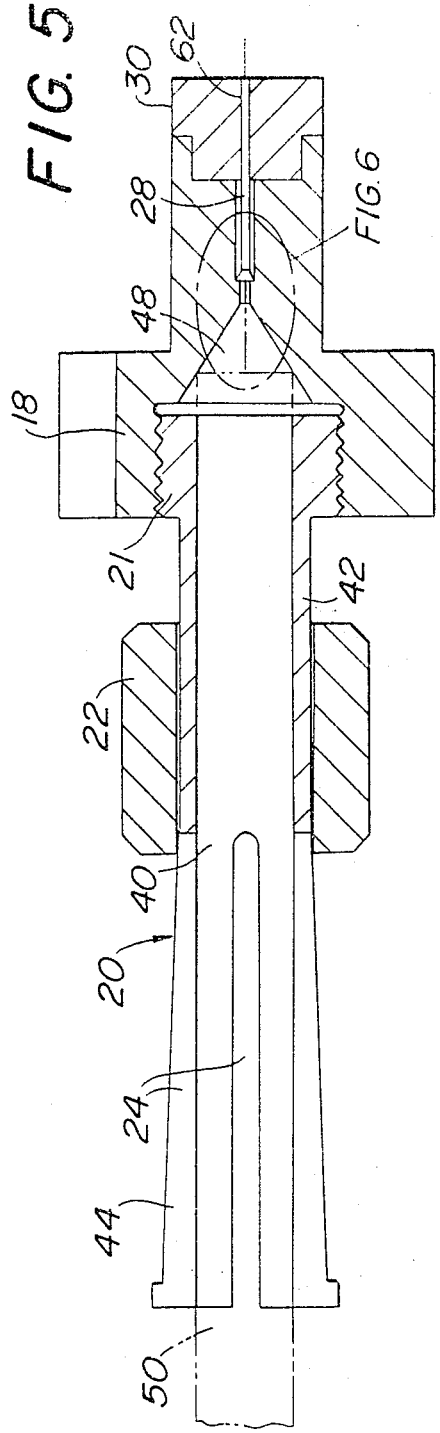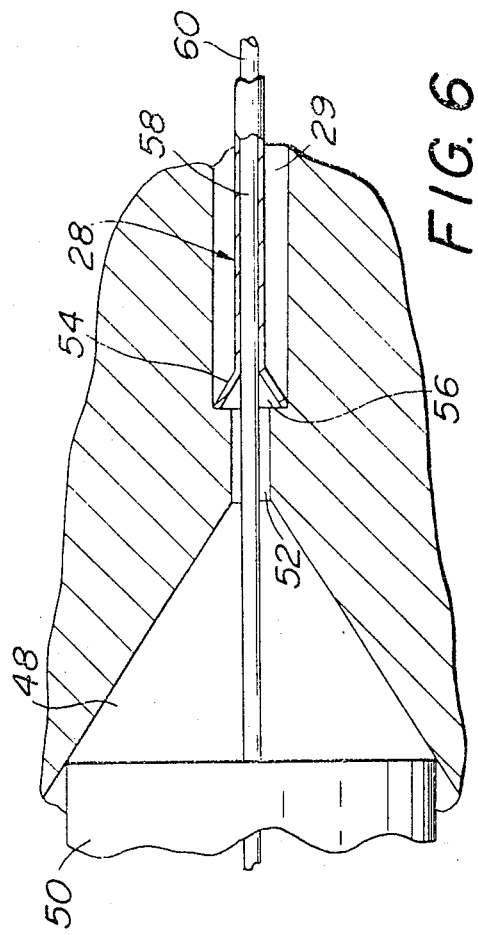

ADAPTABLE CONNECTOR FOR A FIBER OPTIC TESTING DEVICE

BACKGROUND OF THE INVENTION

It is known to use light level measurement instruments to measure attenuation in fiber optic cables. Such instruments are useful in testing for breaks in continuity or other defects causing excess attenuation in the cable. Typically, such instruments use a high-power LED emitter to transmit light into one end of the cable. The other end of the cable is connected to a light level detector, such as a photodiode. A comparison of the light level received by the detector, relative to the light input by the LED, indicates the attenuation across the cable. Cables having defects causing excess attenuation are discovered when the measured attenuation exceeds the levels known to exist in defect-free cables of the same length.

This invention is related to an adaptable connector for connecting fiber optic cables to such a test set.

Fiber optic cables are provided with terminal connectors prior to their inclusion in an optical circuit. The terminal connectors are used to hold the small diameter glass fiber of the cable in optical alignment with other fibers, light sources, or light receivers. There are a wide variety of such connectors in current use. This variety creates a problem for fiber optic test instruments (hereinafter referred to as test sets) of the type described above. In the test set, the optical fiber must be held in precise coaxial alignment with the LED and, to a lesser extent, with the detector. With the wide variety of terminal connectors in use, the plug-in terminals of a test set may only be compatible with one type of connector.

One commercial test set provides interchangeable plug-in modules that make it possible to adapt the set to accommodate a variety of connectors. However, the module must be changed for each type connector. Another solution, when testing a cable before a terminal connector has been applied, is to attach a terminal connector that is compatible with the test set, and then later remove the connector and replace it with another connector to be used in a circuit.

In view of the above problems associated with testing fiber optic cables, it is an object of the present invention to provide an adaptable connector in a test set whereby fiber optic cables may be tested without permanent terminal connectors. It is necessary for such connector to provide precise alignment and support for the thin optical fiber, and to hold the fiber in precise coaxial alignment with the LED and light detectors. Moreover, it is particularly desirable that the adaptor be able to accommodate cables having differing diameters and having optical fibers of differing diameters. The present invention provides both of these desirable features.

SUMMARY OF THE INVENTION

An adaptable connector is provided for connecting optical fiber cables to a test set for measuring unterminated light attenuation. (As used herein, an unterminated fiber optic cable is one without a fixture on its terminal for connecting it to a device such as another cable, instrument or the like.) A cable adaptor section is provided to receive and secure fiber optic cables of different diameters. The cable adaptor section has a cylindrical bore for receiving the cable. The cable adaptor section is made relatively flexible towards the axis of its bore by spaced slots extending axially inward from the insertion end. The outside dimensions of the cable adaptor section are flared, with the outside dimensions of the adaptor section increasing toward the cable insertion end. A sliding ring is disposed around the cable adaptor section and has an inside diameter such that the cable adaptor section is compressed radially inward when the ring is slid toward the flared end. Thus, cables of varying dimensions may be secured by the clamping compression of the ring on the flared end. The cable adaptor section may be easily removed from the connector and replaced with another similar adaptor section having a bore of a different diameter to accommodate even a greater range of cable sizes. Also provided is an optical fiber adaptor section having a cylindrical bore coaxially aligned with the bore of the cable adaptor section. The optical fiber adaptor section receives the unsheathed optical fiber and maintains it in precise optical alignment with the relevant light sources and receivers of the test set. The optical fiber adaptor may be easily removed and replaced with a similar adaptor having a different diameter to accommodate optical fibers of different sizes. Disposed between the cable adaptor section and the fiber adaptor section is a conical section for guiding the optical fiber into the bore of the fiber section.

BRIEF DESCRIPTION OF THE DRAWINGS

For the purpose of illustrating the invention, there is shown in the drawings a form which is presently preferred, it being understood, however, that this invention is not limited to the precise arrangements and instrumentalities shown.

FIG. 3 is an exploded view of a connector according to the present invention for use with the LED terminal of a test set.

FIG. 4 is an exploded view of a connector according to the present invention for use with a light receiver terminal of the test set.

FIG. 5 is a sectional view of a connector as viewed along the line 5—5 of FIG. 1.

FIG. 6 is a closeup of the portion of FIG. 5 enclosed in the oval labeled 6.

DETAILED DESCRIPTION OF THE SPECIFICATION

Figure 1:
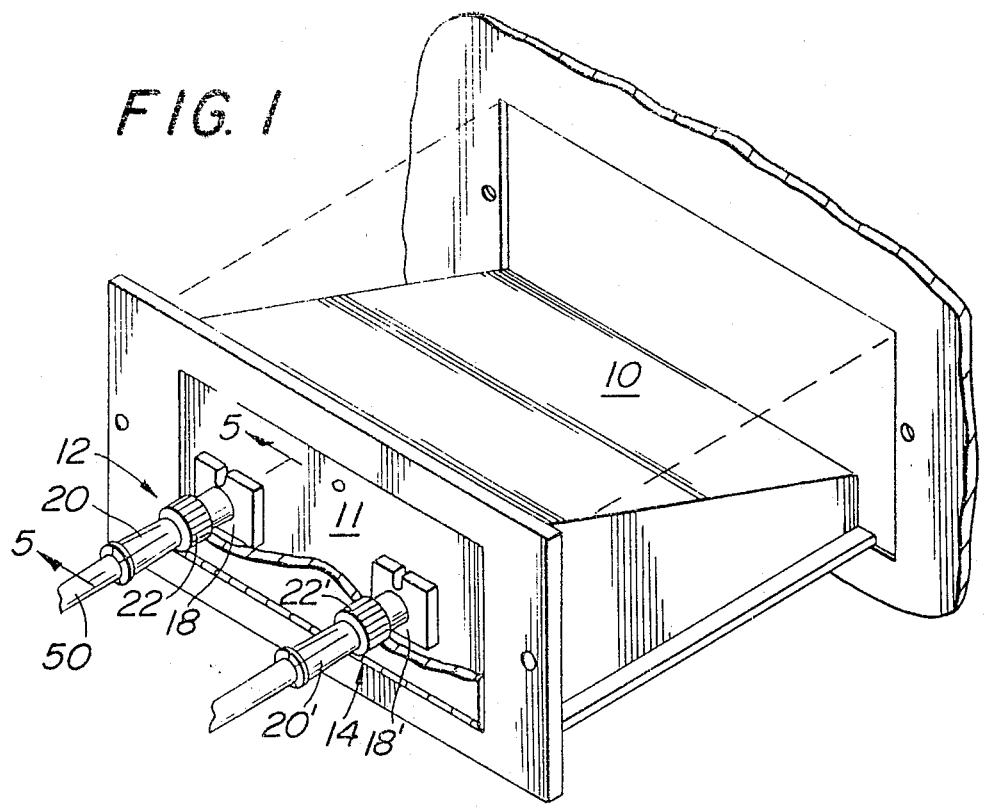
FIG. 1 is a perspective view of the housing of an optical fiber test set, showing the relative location and environment of the adaptable connectors of the present invention.
Figure 2:
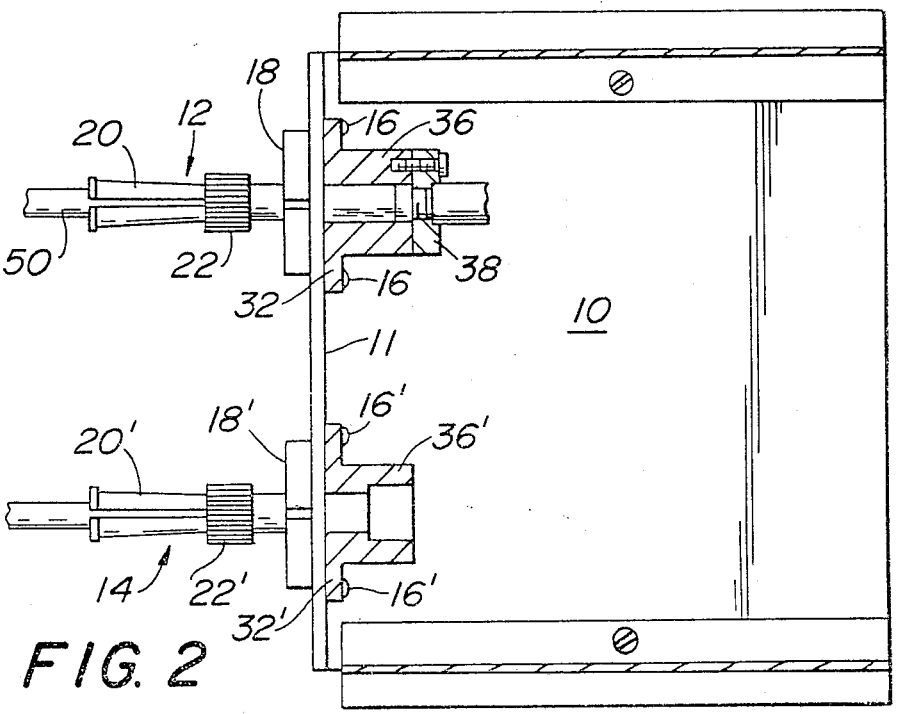
FIG. 2 is a top view of the apparatus depicted in FIG. 1.

Referring now to the drawings wherein like numbers indicate like elements, there is shown in FIGS. 1 and 2 the housing 10 of an optical fiber test set. The interior circuitry of the test set plays no part in the present invention, and is well known in view of a number of commercial sets of this type currently available, consequently it is not depicted. For purposes of understanding the present invention, it is sufficient to indicate generally that test sets of this type typically employ an LED light source, a light level receiver such as a photodiode, and circuitry for comparison of the light intensity emitted by the LED to the light received back at the photodiode.

The LED light source directs light into one end of an optical fiber. The fiber should always be placed in the same optical relationship with respect to the LED in order that the comparison test give true readings. Accordingly, it is necessary to provide a terminal connector to maintain the fiber in this proper relationship. To a lesser extent, the other end of the fiber should always be in the same alignment with the photodiode to give a true comparison.

It is desirable, for the reasons given in the background of the invention above, to provide temporary terminal connectors attached to the test set, so that an unterminated cable may be tested prior to the affixing of permanent connectors for inclusion in an optical circuit. As fiber optic cables may be of different diameters overall, and may also have optical fibers of different diameters, it is also desirable that the temporary connectors be adaptable for different sizes of cable.

There is shown in FIGS. 1 and 2 two such connectors, connector 12 for the LED terminal and connector 14 for the light receiver terminal. Connectors 12 and 14 are attached to housing 10 by inserting blocks 18 and 18' respectively into provided channels.

Referring now the FIGS. 3 and 4, there are shown exploded views of connectors 12 and 14 respectively. Connectors 12 and 14 are identical, the only difference in the drawings being that connector 12 is inserted into structure to accomodate the LED, and connector 14 is inserted into structure to accomodate the photodiode. Hence, only connector 12 in FIG. 3 will be described in full, with the elements designated by prime numbers in FIG. 4 corresponding to identical elements in FIG. 3.

Fiber optic cables comprise one or more thin strands of light conducting fibers coaxially surrounded by a protective sheath. The sheath increases the diameter of the cable well in excess of the diameter of the light conducting fibers. Connector 12 has a cable adaptor portion 20 to accommodate the protective sheath, and to clamp the cable in place by pressure on the sheath.

Cable adaptor 20 has a threaded portion 21 to allow it to be screwed into a threaded bore of housing block 18. Adaptor 20 is provided with a generally cylindrical bore 40 to receive the sheathed cable. A sliding collar 22 is fitted around adaptor 20. Slots 24 extend from the insertion end of adaptor 20 to approximately the longitudinal center thereof, and are spaced about equally apart from each other.

Integrally formed as part of block 18 is a generally cylindrical portion 26. Optical fiber adaptor tube 28, which is preferably a drawn seamless metal tube, is fitted into a bore 29 of member 26, and is held in position therein by a centering disk 30 seated in a recessed bore of portion 26. Disk 30 may be threaded into portion 26. An LED mounting ring 32 overlies meber 26, and receives machine screws 16 in threaded screw holes 34 to mount ring 32 against the inside face of faceplate 11. Integral with ring 32 is a hollow cylindrical portion 36. A mounting ring 38 for the LED (not shown) is attachable to cylindrical portion 36.

In FIG. 4, a photodiode mounting ring 32' is attached to faceplate 11 by machine screws in screw holes 34'. A photodiode (not shown) is mounted in a recessed chamber of cylindrical portion 36'.

Referring now to FIG. 5, a cross-sectional view shows the relevant interior geometry of the connector 12. Cable adaptor 20 has a uniform interior diameter in cylindrical bore 40. However, the exterior diameter of adaptor 20 is not uniform along its entire length, but rather has a straight section 42 with a uniform external diameter and a flared section 44 is which the outside diameter is gradually increasing from the center outward. This increasing diameter section 44 works in conjunction with a sliding collar 22 to clamp the fiber optic cable in place after it is inserted into connector 12. Section 44 is made relatively flexible in a radially inward direction by slots 24. When sliding collar 22 is drawn over flared section 44, pressure is exerted to compress section 44 in the area under collar 22. If a fiber optic cable is inserted, this compressing force produces a friction grip on the cable to hold it in place against the weight of the cable loop. Cable adaptor 20 thus can accommodate fiber optic cables of different diameters, so long as the diameters of the cables are not greater than the diameter of the bore of adaptor 20 nor so small that they cannot be clamped by the ring 22 compressing the bore of adaptor 20 at the flared end.

Adaptor 20 is provided with a threaded portion 21 so that it may be screwed into a threaded bore of housing block 18. This connection allows for the removal of adaptor 20, and replacement with a similar adaptor having a different diameter bore, to accommodate cables of different diameters which would not be compatible with adapter 20. A cover plate (not shown) may be provided to cover blocks 18 and 18' when the cable adaptors are removed and the set is not in use, so that dust and grease cannot enter the terminals.

Housing block 18 has a conical bore 48 which is coaxially aligned with bore 40. The diameter of the bore at the base of the cone is larger than the diameter of bore 40, and should be at least as large as the diameter of the bore of the largest diameter adaptor to be used. As shown in FIG. 6, the optical fiber cable 50 is inserted into the connector until it contacts the walls of conical bore 48. Bore 48 is coaxially aligned with and opens at the apex of the cone onto a cylindrical bore 52. Bore 52 in turn is coaxially aligned with and opens onto a larger diameter cylindrical bore 29. A fiber adaptor tube 28 has a flared end 54 which produces a conical bore 56. Bore 56 tapers to a uniform diameter cylindrcial bore portion 58.

When the optical fiber cable 50 is inserted into connector 12, the walls of conical portion 48 center optical fiber 60 into bore 52. Conical bore 56 in turn centers the fiber into cylindrical bore 58. Bore 58 should have an inside diameter nearly equal to or just slightly larger than the outside diameter of the fiber guide 60 to be tested, in order that fiber 60 be held firmly and in precise coaxial alignment with the LED light source.

Adaptor tube 28 is held in position by centering disk 30. Disk 30 is seated in a recessed mouth 64 of housing block 18. Centering disk 30 has a cylindrical bore 62 having an inside diameter approximately equal to the outside diameter of tube 28, so that a friction fit is effected. Alternatively disk 30 may be threaded into mouth 64. Centering disk 30 may be removed from mouth 64, allowing fiber adaptor tube 28 to be removed and replaced with an adaptor tube having a different sized interior diameter 58 to accommodate an optical fiber 60 of different outside diameter.

Thus, connector 12 is adapted to provide a temporary terminal connection for an otherwise unterminated fiber optic cable. Connector 12 holds the unterminated cable firmly in place, and supports the fiber optic light guide in precise coaxial alignment with an LED light source. The cable adaptor 20 and sliding collar 22 can accommodate cables having a variety of outside diameters. Connector 12 also may be easily disassembled and converted to be used with optical cable having even a larger range of cable diameters, or different light guide diameters or both, by removing and replacing the cable adaptor 20 and/or the fiber adaptor tube 28.

From the above, it may be seen that a temporary adaptable terminal connector has been provided meeting all of the objectives of the invention.

The present invention may be embodied in other specific forms without departing from the spirit or essential attributes thereof and, accordingly, reference should be made to the appended claims, rather than to the foregoing specification, as indicating the scope of the invention.

We claim:

1. An adaptable connector for connecting unterminated optical fiber cables to a test set or the like, comprising:
    (a) an optical fiber adapter section having a cylindrical bore for receiving an unsheathed optical fiber of a fiber optic cable, the diameter of the bore being slightly larger than the outside diameter of the optical fiber whereby the fiber may be inserted in a sliding conformal fit in said bore;
    (b) a cable adapter section having a cylindrical bore for receiving the fiber optic cable therein, said bore being coaxially aligned with the bore of the fiber adapter section, the cable adapter section having means to secure fiber optic cables of different diameters;
    (c) a conical chamber disposed between the bore of the cable adapter section and the bore of the fiber adapter section, the axis of said conical section being coaxially aligned with the bores of the cable adapter section and the fiber adapter section, the base end of said conical chamber opening onto the bore of the cable adapter section and the apex end of said conical chamber opening onto the bore of the fiber adapter section, whereby the conical chamber guides the optical fiber into the bore of the fiber adapter section when the fiber optic cable is inserted into the connector;
    (d) said optical fiber adapter section including a hollow metallic tube having one end thereof flared outward to form a second conical chamber to guide the optical fiber into the cylindrical bore of the optical fiber adapter section, said flared end also supporting the fiber adapter section in proper alignment within the conical chamber.

2. An adaptable connector as in claim 1 wherein the cable adapter section is made relatively flexible in a radially inward direction by spaced slots extending axially from the end of the cable adapter section into which the cable is inserted, the outside dimensions of the cable adapter section being flared so that the outside dimensions increase toward the cable insertion end, and a sliding ring being disposed around the cable adapter section, said ring having an inside diameter such that the cable adapter section is compressed radially inward when the ring is slid toward the flared end, thereby providing a clamping force to temporarily hold secure optical fiber cables of varying sizes.

* * * * *